W. A. ESTES.
Plow.
No. 212,205.　　　　　Patented Feb. 11, 1879.
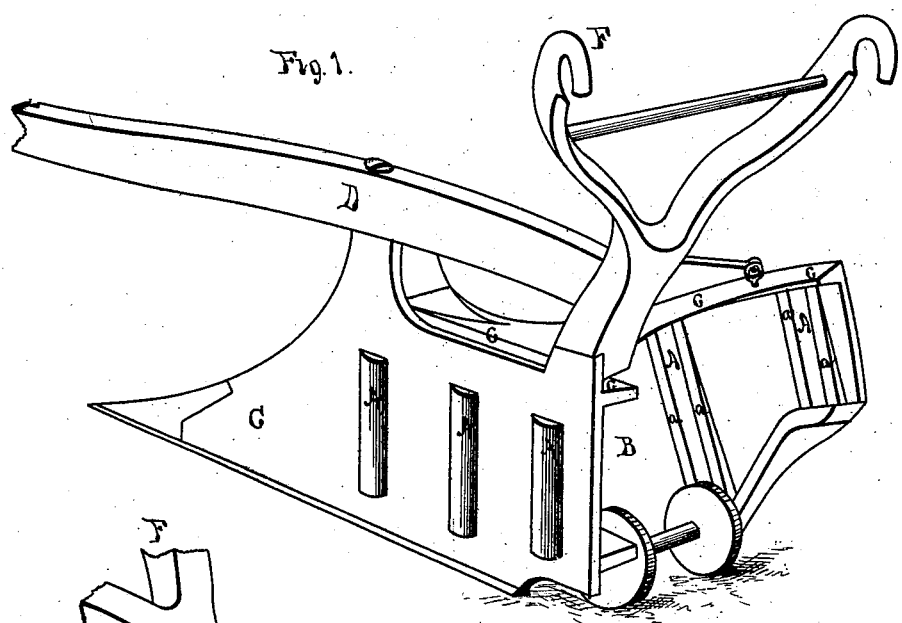
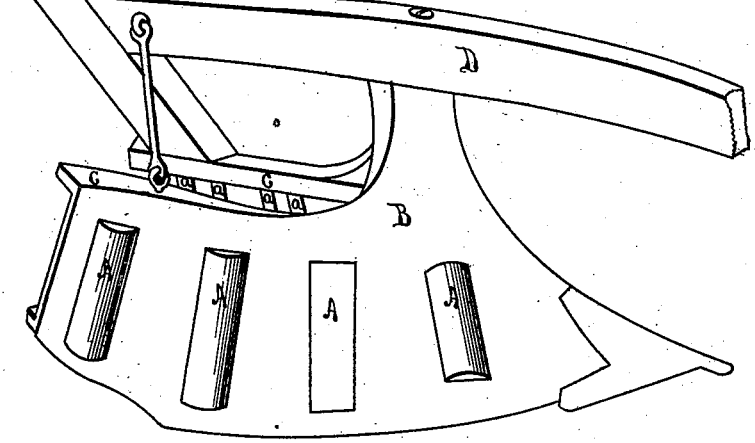
Witnesses
Wm. S. Brown,
N. P. Ockington.
Inventor
William A. Estes
By David Hall Rice.
His Atty

UNITED STATES PATENT OFFICE.

WILLIAM A. ESTES, OF CHINA, MAINE, ASSIGNOR OF ONE-HALF HIS RIGHT TO JESSE BOYNTON, OF PROVIDENCE, RHODE ISLAND, AND CHARLES GIFFORD, OF GARDINER, MAINE.

IMPROVEMENT IN PLOWS.

Specification forming part of Letters Patent No. 212,205, dated February 11, 1879; application filed November 11, 1878.

*To all whom it may concern:*

Be it known that I, WILLIAM A. ESTES, of China, in the county of Kennebec and State of Maine, have made a new and useful Improvement and Invention Relating to Plows, of which the following is a specification:

My invention relates to plows which are provided with rollers set into their land-sides and shares, to avoid the friction incident to the use of the tool, and render its passage through the soil easier; and said invention consists in mounting the said rollers upon friction-bearings, against which their surfaces revolve, substantially as hereinafter described, instead of mounting them upon the axles of the rolls, as heretofore.

In the drawings, Figure 1 is a view of the land-side and a portion of the inside of the share of a plow provided with my invention. Fig. 2 is a view of the exterior of the share side of the plow.

C and B denote respectively the land-side and share. D is the beam of the plow, and F the handles.

This plow is provided with friction-rollers, of suitable size, A A, which are set in the share and land-side, projecting slightly from their faces to receive the pressure of the soil through which the plow passes and facilitate its operation.

Instead of mounting the rollers A A upon axes in the usual manner, I provide small friction-rollers *a a*, which are so placed with reference to the rollers A A as to sustain the latter against the pressure of the soil, and allow them to revolve freely, substantially as shown in the drawings.

The rollers A A are held in place by the plowshare having slots through which they project, of less breadth than the diameter of the rolls, which will prevent the rolls from passing through them when inserted in place. After the rolls A A are inserted in place, the rolls *a a* are secured behind and on each side of the former, as more particularly shown in Fig. 1.

As the rolls *a a* turn upon their axes when pressed upon by the circumference of the rolls A A, they enable the latter to revolve very easily, and no rusting or clogging of the rolls A A will prevent such revolution, as is the case when the rolls A A are mounted upon axes in the ordinary manner.

Heretofore the use of rolls, such as A A, has been attended with the difficulty of the rusting and clogging of the bearings of the axes upon which they revolve, and my improvement is designed to overcome this difficulty.

Above the rolls A A, on the land-side and share of the plow, I provide inwardly-projecting abutments *c c*, which overhang and cover the rolls A A at the point where they take their bearings on which they revolve, and effectually protect the upper ends of the rolls and bearings from being clogged with the earth, which, in the operation of plowing, constantly falls over the land-side and plowshare, and down between them into the furrow.

Great difficulty has heretofore attended the use of rollers like A A from being clogged or choked by this fine dirt constantly descending upon them. This my improvement effectually prevents.

I do not claim the application, broadly, of rollers as the bearings of other rollers or shafts wherever used.

What I claim as new and of my invention is—

In combination with the rolls A A, placed in the share or land-side of the plow, the friction rollers or bearings *a a*, supporting the former upon their periphery and permitting them to revolve, substantially as described.

WILLIAM A. ESTES.

Witnesses:
DAVID HALL RICE,
N. P. OCKINGTON.